(12) United States Patent
Tanaka et al.

(10) Patent No.: US 9,715,053 B2
(45) Date of Patent: Jul. 25, 2017

(54) LIGHT GUIDE, ILLUMINATING DEVICE AND IMAGE READING APPARATUS

(71) Applicant: KONICA MINOLTA, INC., Chiyoda-ku (JP)

(72) Inventors: Masahiko Tanaka, Toyokawa (JP); Satoko Tanaka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 333 days.

(21) Appl. No.: 14/249,391

(22) Filed: Apr. 10, 2014

(65) Prior Publication Data

US 2014/0313738 A1    Oct. 23, 2014

(30) Foreign Application Priority Data

Apr. 23, 2013 (JP) ................ 2013-090114

(51) Int. Cl.
*F21V 7/00* (2006.01)
*F21V 8/00* (2006.01)

(52) U.S. Cl.
CPC .............. *G02B 6/001* (2013.01); *G02B 6/002* (2013.01); *G02B 6/0038* (2013.01); *G02B 6/0078* (2013.01)

(58) Field of Classification Search
CPC ...... G02B 6/001; G02B 6/002; G02B 6/0038; G02B 6/0078
(Continued)

(56) References Cited

U.S. PATENT DOCUMENTS 8,279,499 B2   10/2012   Wilsher 9,182,538 B2 *  11/2015   Sakai .................. G02B 6/0016
(Continued)

FOREIGN PATENT DOCUMENTS

CN        1314614 A    9/2001
CN      101360170 A    2/2009
(Continued)

OTHER PUBLICATIONS

Office Action (Notification of Reasons for Rejection) issued on Apr. 7, 2015, by the Japanese Patent Office in corresponding Japanese Patent Application No. 2013-090114, and an English Translation of the Office Action. (16 pages).
(Continued)

*Primary Examiner* — Andrew Coughlin
*Assistant Examiner* — Jessica M Apenteng
(74) *Attorney, Agent, or Firm* — Buchanan Ingersoll & Rooney PC

(57) ABSTRACT

A light guide having; an entrance portion; a light-splitting portion; a first and a second light guide portion; and a first and a second reflective portion provided in or on the first and second light guide portions, respectively. The first and second light guide portions emit light reflected by the first reflective portion and light reflected by the second reflective portion to outside as a first linear light beam and a second linear light beam, respectively. The light-splitting portion projects toward the entrance portion, and has a first inclined surface, a second inclined surface and a connecting section. The entrance portion has a light-diffusing section opposed to the connecting section in a direction of optical axis, and the light-diffusing section diffuses the light emitted from the point light source toward the first light guide portion and the second light guide portion.

13 Claims, 8 Drawing Sheets

(58) Field of Classification Search
USPC .................. 362/298, 343, 97.1, 600–634
See application file for complete search history.

(56) References Cited

U.S. PATENT DOCUMENTS

| | | |
|---|---|---|
| 2001/0035986 A1 | 11/2001 | Ikeda |
| 2006/0028842 A1 | 2/2006 | Kim et al. |
| 2009/0034285 A1 | 2/2009 | Lee et al. |
| 2009/0052205 A1* | 2/2009 | Chen ..................... G02B 6/001 362/612 |
| 2010/0277775 A1 | 11/2010 | Tochigi et al. |
| 2011/0273751 A1 | 11/2011 | Wilsher |
| 2013/0038913 A1 | 2/2013 | Shimoda et al. |

FOREIGN PATENT DOCUMENTS

| | | |
|---|---|---|
| CN | 102930631 A | 2/2013 |
| JP | 10-143601 A | 5/1998 |
| JP | 10-173870 A | 6/1998 |
| JP | 2005-032579 A | 2/2005 |
| JP | 2006-49324 A | 2/2006 |
| JP | 2010-277070 A | 12/2010 |
| JP | 2012-065149 A | 3/2012 |

OTHER PUBLICATIONS

Office Action (The First Office Action) dated Sep. 1, 2016 issued by the State Intellectual Property Office of the People's Republic of China in corresponding Chinese Patent Application No. 201410165785.8, and English language translation of Office Action (19 pages).

* cited by examiner

LIGHT GUIDE, ILLUMINATING DEVICE AND IMAGE READING APPARATUS

This application claims the benefit of Japanese Patent Application No. 2013-090114 filed on Apr. 23, 2013, the content of which is incorporated herein by reference.

BACKGROUND OF THE INVENTION

1. Field of the Invention

The present invention relates to a light guide changing light emitted from a point light source to a linear form and emitting the linear light beam, an illuminating device comprising the light guide, and an image reading apparatus comprising the illuminating device.

2. Description of Related Art

As an example of conventional illuminating devices, a device disclosed by U.S. Pat. No. 8,279,499 is known. As shown by FIG. 11, the illuminating device disclosed by U.S. Pat. No. 8,279,499 comprises a light source 640. Light emitted from the light source 640 is split by a splitter 650 into two. One of the split light beams enters light guide 660a and the other thereof enters light guide 660b.

The illuminating device 520, however, has a problem of not making effective use of the light emitted from the light source 640. The splitting portion of the splitter 650 for splitting the light to travel toward the light guides 660a and 660b comprises two inclined surfaces designed at an angle of a to each other. The junction of these inclined surfaces is actually formed as a curved surface due to the nature of molding or cutting. Light entering the junction is scattered thereon and/or passes through the junction. Accordingly, part of the light emitted from the light source 640 leaks from the illuminating device 520 without entering the light guides 660a and 660b. Thus, in the illuminating device 520, the junction of the inclined surfaces is a cause of low usage efficiency of the light emitted from the light source 640.

SUMMARY OF THE INVENTION

The present invention provides a light guide capable of making efficient use of light emitted from a light source, an illuminating device comprising the light guide, and an image reading apparatus comprising the illuminating device.

According to a first aspect of the present invention, a light guide comprises: an entrance portion which light emitted from a point light source enters; a light-splitting portion configured to split the light passing through the entrance portion into first light and second light; a first light guide portion and a second light guide portion configured to guide the first light and the second light, respectively, in a specified direction while total-reflecting the first light and the second light, respectively; and a first reflective portion and a second reflective portion provided in or on the first light guide portion and in the second light guide portion, respectively, the first reflective portion and the second reflective portion configured to reflect the first light propagating in the first light guide portion and the second light propagating in the second light guide portion, respectively. The first light guide portion and the second light guide portion are configured to emit the first and second light reflected by the first reflective portion and the second reflective portion and made no longer meet a condition for total-reflection to outside as a first linear light beam and a second linear light beam, respectively. The light-splitting portion projects toward the entrance portion, and includes a first inclined surface, a second inclined surface and a connecting section. The first inclined surface and the second inclined surface extends toward a first point on an optical axis of the point light source and are substantially symmetrical with each other when viewed from a direction perpendicular to the optical axis. The connecting section connects the first inclined surface and the second inclined surface near the first point. The entrance portion includes a light-diffusing section opposed to the connecting section in a direction of the optical axis, and the light-diffusing section is configured to diffuse the light emitted from the point light source toward the first light guide portion and the second light guide portion.

According to a second aspect of the present invention, an illuminating device comprises the light guide described above.

According to a third aspect of the present invention, an image reading apparatus comprises the illuminating device.

DETAILED DESCRIPTION OF THE PREFERRED EMBODIMENTS

Embodiments

Figure 1:
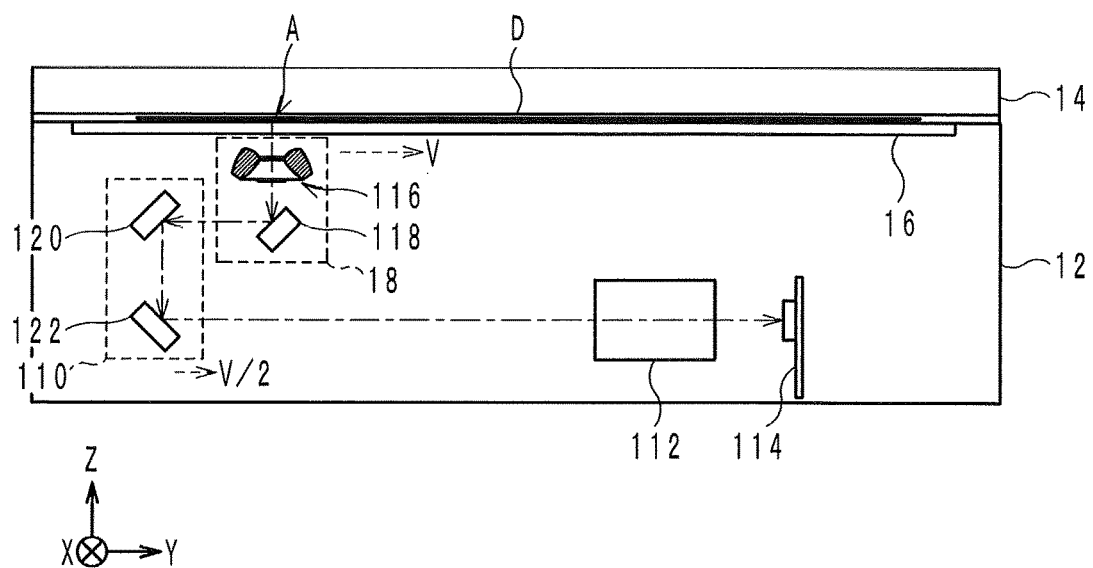
FIG. 1 is a schematic view showing the general structure of an image reading apparatus according to an embodiment of the present invention.

A light guide, an illuminating device and an image reading apparatus according to an embodiment of the present invention will be described with reference to the accompanying drawings.

Introduction

First, the X-axis, Y-axis and Z-axis in the drawings are described. The X-axis, Y-axis and Z-axis are perpendicular to one another. The X-axis, Y-axis and Z-axis show a main-scanning direction, a sub-scanning direction and a vertical (up-down) direction, respectively, of the image reading apparatus. The X-axis shows not only the main-scanning direction but also a longitudinal (front-back) direction of the light guide, the illuminating device and the image reading apparatus, and a direction of optical axis of a point light source. The Y-axis shows not only the sub-scanning direction but also a horizontal (right-left) direction of the light guide, the illuminating device and the image reading apparatus.

Structure of the Image Reading Apparatus

As shown by FIG. 1, the image reading apparatus 1 comprises a housing 12, a document cover 14, a platen glass 16, a first slider unit 18, a second slider unit 110, a focusing lens 112, an image pick-up device 114, an illuminating device 116, a first mirror 118, a second mirror 120 and a third mirror 122.

The slider units 18 and 110, the focusing lens 112, the image pick-up device 114, the illuminating device 116, and the mirrors 118, 120 and 122 are encased in the housing 12.

In the upper surface of the housing 12, a substantially rectangular opening is formed. In the opening, a platen glass 16 is fitted. A document D is placed on the platen glass 16 with its side targeted for image reading down.

The document cover 14 is located on the upper surface of the housing 12 so as to be openable and closable. The document cover 14 is closed by a user to cover the document D.

Figure 2:
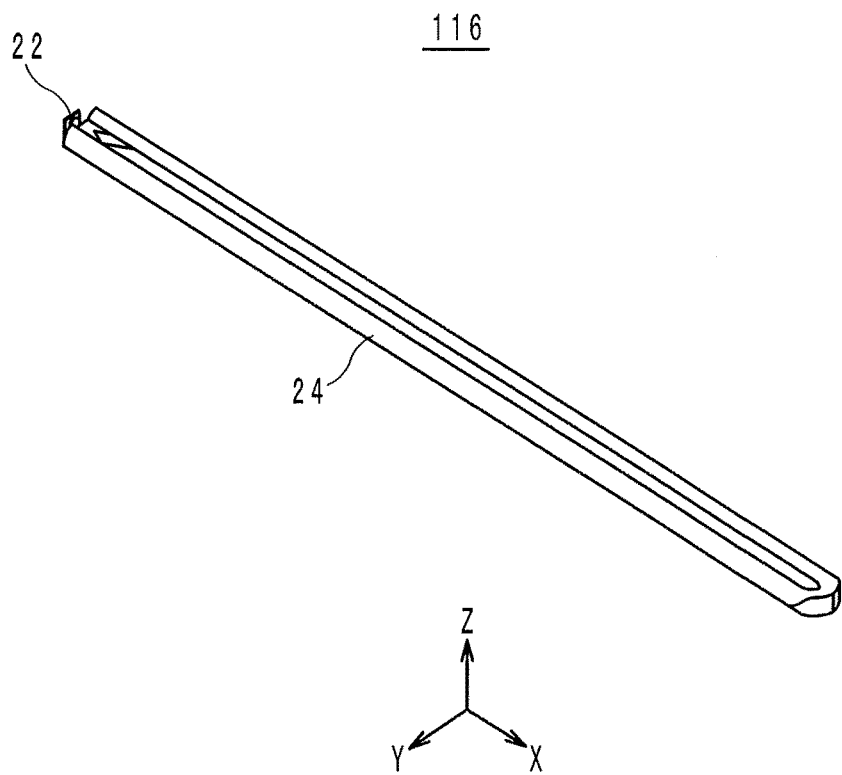
FIG. 2 is a perspective view of an illuminating device employed in the image reading apparatus shown by FIG. 1.
Figure 3:
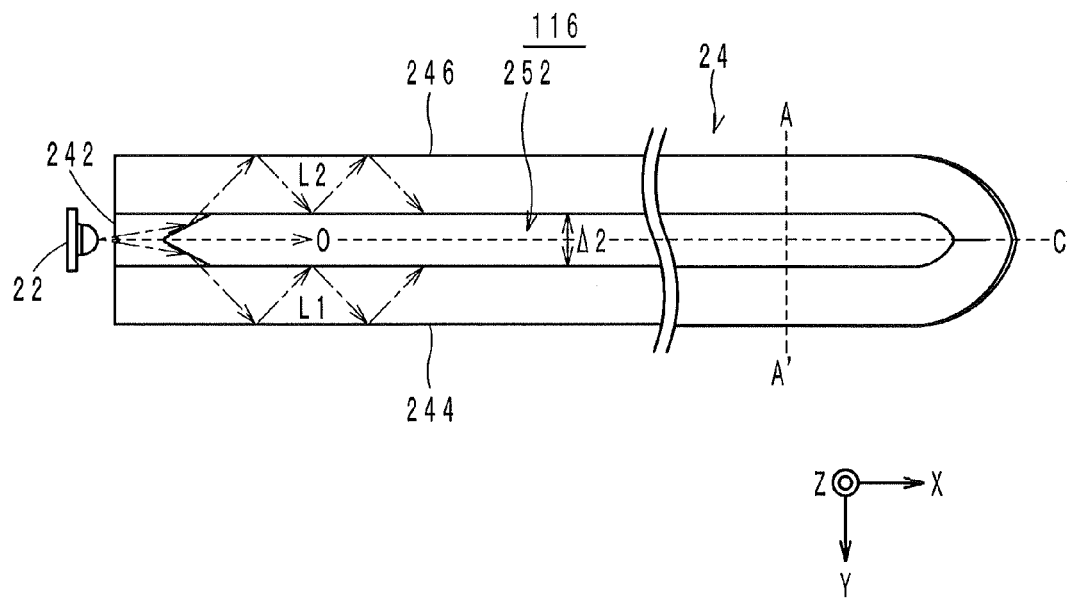
FIG. 3 is a top view viewed from a positive Z-axis side of the illuminating device shown by FIG. 2.
Figure 4:
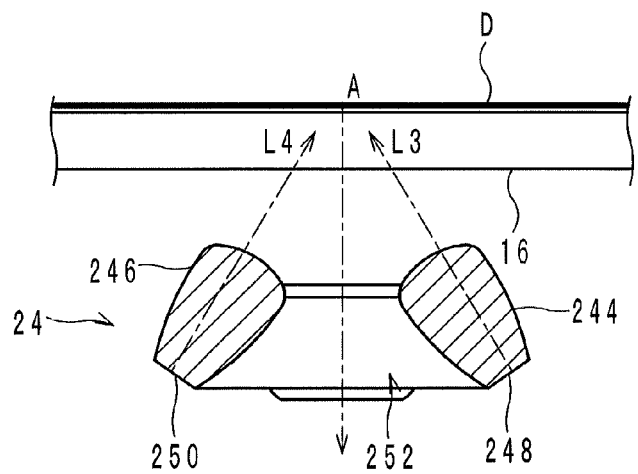
FIG. 4 is a vertical cross-sectional view viewed from a negative X-axis side of a light guide, taken along the line A-A' in FIG. 3.
Figure 4:
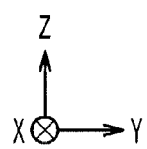

The illuminating device 116 is typically located under the platen glass 16 as shown in FIG. 1. The illuminating device 116, as shown in FIGS. 2 to 4, comprises a point light source 22 and a light guide 24, and generates, from light emitted from the point light source 22, two linear light beams in the light guide 24. The illuminating device 116 then emits the two linear light beams from two portions of the light guide 24, respectively, to irradiate a predetermined reading area A of the document D placed on the platen glass 16. The reading area A corresponds to one main-scanning line of the document D. The illuminating device 116 will be described later, and only a brief description thereof has been given.

The mirrors 118, 120 and 122 are to direct light reflected by the document D to the focusing lens 112 as shown by the alternate long and short dash line.

The illuminating device 116 and the mirror 118 are loaded on the first slider unit 18. While the image reading device 1 operates to read the image of the document D, the first slider unit 18 carries the illuminating device 116 and the mirror 118 at a velocity of V in the sub-scanning direction along the lower surface of the platen glass 16.

The mirrors 120 and 122 are loaded on the second slider unit 110. While the image reading device 1 operates to read the image of the document D, the second slider unit 110 carries the mirrors 120 and 122 at a velocity of V/2 in the sub-scanning direction under the platen glass 16 keeping a slight distance from the lower surface of the platen glass 16. By the speed-controlled movements of the slider units 18 and 110, the optical path length of the reflected light from the document D to the image pick-up device 114 is kept constant during the image reading operation. The movements of the slider units 18 and 110 also permit the illuminating device 116 to irradiate all reading areas A of the document D with the two linear light beams while moving in the sub-scanning direction.

The light reflected by the mirror 122 enters the focusing lens 112. The focusing lens 112 transmits and focuses incident light on the image pick-up device 114. The image pick-up device 114 receives the focused light on light-receiving surfaces and converts the light into electric signals indicative of pixel values for each main-scanning line of the document D, with RGB values.

Illuminating Device

Next, the illuminating device 116 is described. As mentioned, the illuminating device 116 includes a point light source 22 and a light guide 24 as shown in FIG. 2.

The point light source 22 is generally an LED (light emitting diode) emitting white light. The point light source 22 has a half-value angle of, for example, about 120 degrees. The half-value angle here means an angle between rays of light, of the light emitted from the point light source 22, having 50% luminance of the luminance of the light traveling in the direction of the optical axis O of the point light source 22.

The light guide 24 has a length, which is size in the X-axis direction, of, for example, about 300 nm. The light guide 24 is made by casting of a transparent material with high light transmissibility. An example of such materials is a resin material such as PMMA (poly methyl methacrylate). The light guide 24 may be made of glass. The light guide 24 is preferably in a shape symmetrical about a longitudinal median plane C. The longitudinal median plane C here means a plane substantially in parallel to a ZX plane and includes the center point of the light guide 24 in the Y-axis direction. The light guide 24 is made by casting as mentioned. In terms of function, however, as shown by FIGS. 3 and 4, the light guide 24 is divided into a light-splitting portion 242, a first light guide portion 244, a second light guide portion 246, a first reflective portion 248, and a second reflective portion 250. These portions are hereinafter described.

Detailed Structure of the Light-Splitting Portion

Figure 5:
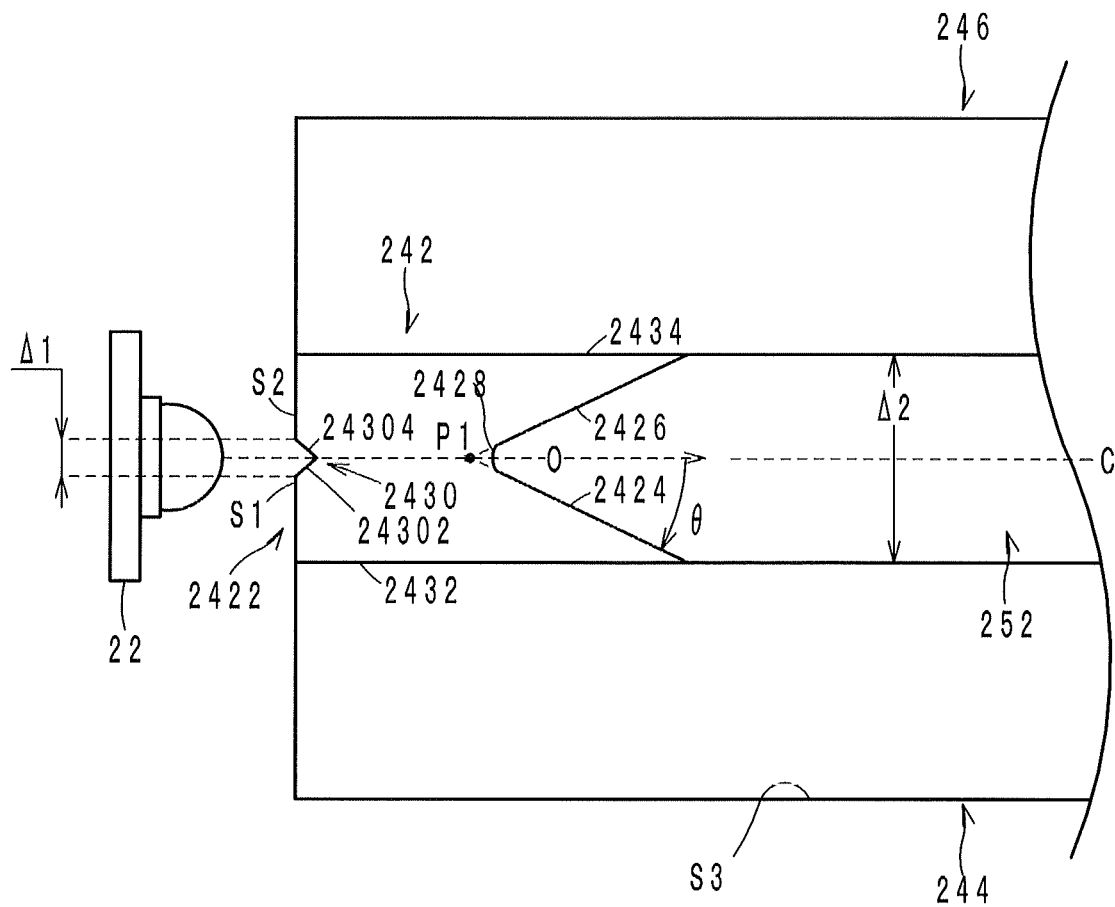
FIG. 5 is a top view of a light-splitting portion shown in FIG. 3, showing the detailed structure of the light-splitting portion.

The light-splitting portion 242, as shown by FIG. 5, comprises an entrance portion 2422, a first inclined surface 2424, a second inclined surface 2426 and a light-diffusing section 2430.

The entrance portion 2422 has two main surfaces S1 and S2 in parallel to a YZ plane. The main surfaces S1 and S2 are symmetrical with each other about the longitudinal median plane C and are separate from each other at a distance of Δ1 in the Y-axis direction. The point light source 22 is positioned with reference to the entrance portion 2422.

The point light source 22 is positioned with reference to the entrance portion 2422 so as to meet the following conditions: (1) the point light source 22 faces to the main surfaces S1 and S2; (2) the point light source 22 is located at a negative X-axis side of the entrance portion 2422; (3) the optical axis O of the point light source 22 is perpendicular to the main surfaces S1 and S2; (4) the optical axis O is included in the longitudinal median plane C; and (5) the point light source 22 is located near the entrance portion 2422 such that light emitted from the point light source 22 at a maximum radiation angle can enter the entrance portion 2422.

The inclined surface 2424 is a rectangular surface and is designed to cross the longitudinal median plane C at an angle of θ when viewed from a positive side of Z-axis (i.e., in the plan view shown by FIG. 5) and to include a first point P1 on the optical axis O. The inclined surface 2424 is designed to extend from the first point P1 to a positive side of X-axis and positive side of Y-axis at an angle of θ to the longitudinal median plane C. The angle θ meets the following condition shown by the expression (1).

$$\theta \leq \frac{\pi}{4} - \frac{1}{2} \cdot \arcsin\frac{1}{n} \quad (1)$$

In the expression (1), n denotes the refractive index of the material of the light guide 24. When n=1.5, the angle θ is equal to or less than about 24.1 degrees. When θ=0, the inclined surface 2424 is perpendicular to the entrance portion 2422. The angle θ is shown by a value measured from the longitudinal median plane C in the clockwise direction.

The inclined surface 2426 is substantially symmetrical with the inclined surface 2424 about the longitudinal median plane C.

A light-splitting surface, which is comprised of the first inclined surface 2424, the second inclined surface 2426 and a connection surface 2428, is opposed to the entrance portion 2422 in the X-axis direction and projects toward the entrance portion 2422.

In the plan view shown by FIG. 5 (i.e., when viewed from the Z-axis direction), the inclined surfaces 2424 and 2426 actually do not cross each other at an angle of 2×θ. Due to the nature of casting and cutting, the apexes of the inclined surfaces 2424 and 2426 are curved (arc shaped). The curved apexes form the connection surface 2428.

Figure 6:
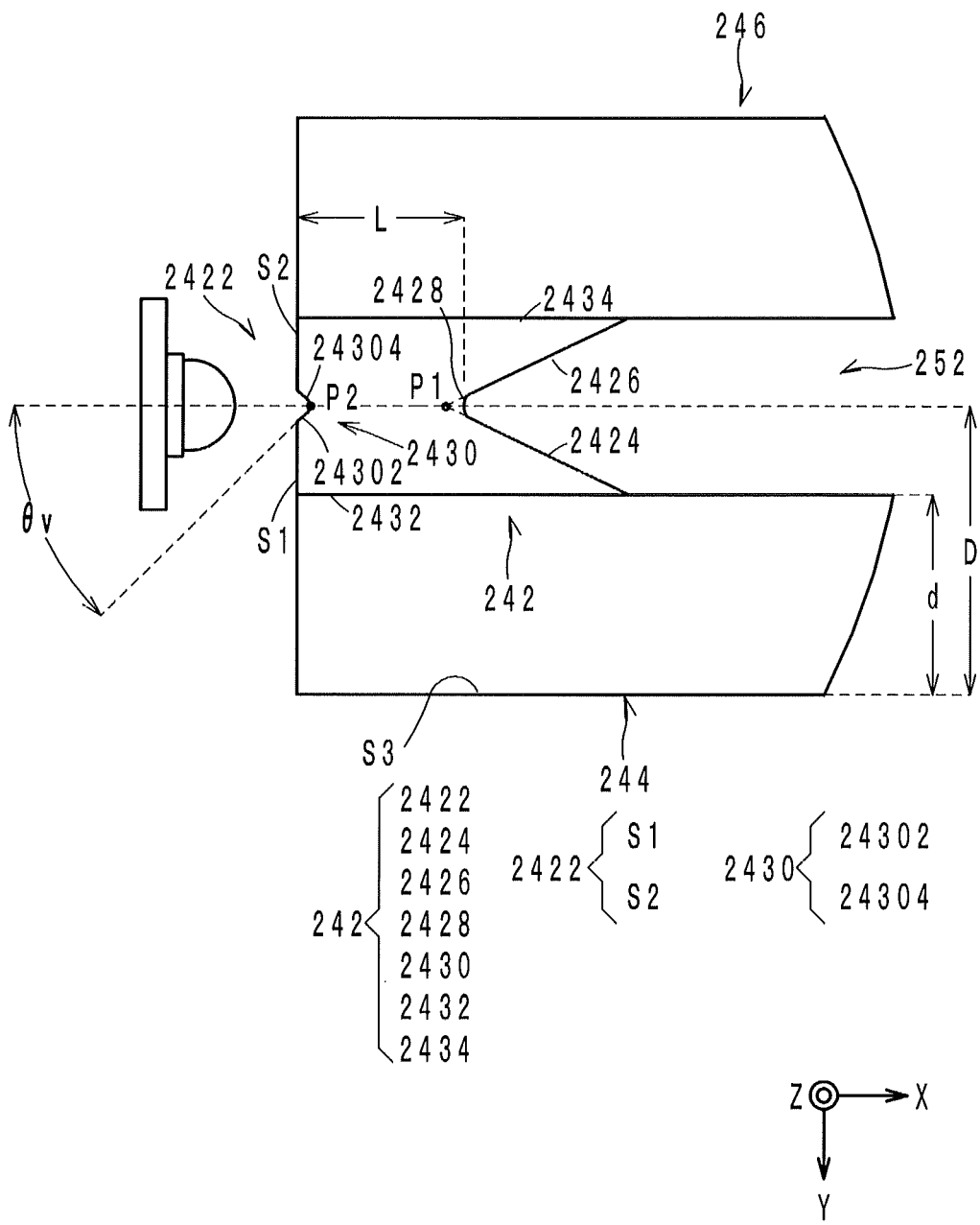
FIG. 6 is a top view of the light-splitting portion, showing the distance between a main surface and a connection surface shown in FIG. 3.

When the distance in the X-axis direction from each of the main surfaces S1 and S2 to the connection surface 2428 is denoted by L as shown in FIG. 6, the distance L is designed so as to meet the following condition shown by the expression (2).

$$L \leq \frac{d}{\tan\left\{\arcsin\left(\frac{\sin\gamma}{n}\right)\right\}} - \frac{D-d}{\tan\theta} \quad (2)$$

In the expression (2), D denotes the distance from the longitudinal median plane C to each of the positive Y-axis end and the negative Y-axis end of the light guide 24 in the plan view shown by FIG. 6 (i.e., when viewed from the Z-axis direction). In the expression (2), d denotes the width (i.e., size in the Y-axis direction) of each of the light guide portions 244 and 246 in the plan view shown by FIG. 6 (i.e., when viewed from the Z-axis direction), and γ denotes the maximum radiation angle of the point light source 22. In the expression (2), θ and n denote the same things as in the expression (1). For example, when D=10 mm, d=7 mm, θ=24 degrees, n=1.5 and the maximum radiation angle of the point light source is set to 50 degrees, the distance L is equal to or less than about 5 mm.

The positive Y-axis end of the entrance portion 2422 and the positive Y-axis end of the inclined surface 2424 are connected via a surface 2432, and the negative Y-axis end of the entrance portion 2422 and the negative Y-axis end of the inclined surface 2426 are connected via a surface 2434. The positive Z-axis end of the entrance portion 2422 and the positive Z-axis ends of the inclined surfaces 2424 and 2426 are connected via a surface (not shown), and the negative Z-axis end of the entrance portion 2422 and the negative Z-axis ends of the inclined surfaces 2424 and 2426 are connected via a surface (not shown).

In this embodiment, the light-diffusing section 2430 is located in the entrance portion 2422, and specifically, the light-diffusing section 2430 is a groove formed between the main surfaces S1 and S2 to extend in the Z-axis direction. In the plan view shown by FIG. 6 (when viewed from the Z-axis direction), the groove is a notch cut toward the connection surface 2428. More specifically, the light-diffusing section 2430, as shown in FIG. 6, includes a third inclined surface 24302 and a fourth inclined surface 24304.

The inclined surface 24302 is a rectangular surface. The inclined surface 24302 crosses the longitudinal median plane C at an angle of $\theta_v$ when viewed from the Z-axis direction (see FIG. 6) and includes a second point P2 on the optical axis O. The point P2 is located at the negative X-axis side of the point P1 and at the positive X-axis side of the main surfaces S1 and S2. The inclined surface 24302 extends from the point P2 in the negative X-axis and positive Y-axis direction at the angle $\theta_v$ to the longitudinal median plane C. The angle $\theta_v$ meets the following condition shown by the expression (3).

$$\theta_v \geq \arcsin\frac{1}{n} \quad (3)$$

In the expression (3), n denotes the refractive index of the material of the light guide 24. When n=1.5, the angle $\theta_v$ is equal to or greater than about 41.8 degrees. When $\theta_v$=0, the inclined surface 24302 is perpendicular to the main surfaces S1 and S2. The angle $\theta_v$ of the inclined surface 24302 is a value measured in the counterclockwise direction from the longitudinal median plane C.

The inclined surface 24304 is substantially symmetrical with the inclined surface 24302 about the longitudinal median plane C.

As mentioned, the distance in the Y-axis direction between the end of the inclined surface 24302 in the negative X-axis direction, and the end of the inclined surface 24304 in the negative X-axis direction, is Δ1 (see FIG. 5), and the distance Δ1 is preferably designed to be about 1 mm.

Detailed Structure of the Light Guide Portion

The light guide portions 244 and 246 are, as shown in FIGS. 2 to 6, rod-like members extending in parallel to the X-axis. The end portions of the light guide portions 244 and 246 in the negative X-axis direction sandwich the light-splitting portion 242 via imaginary surfaces 2432 and 2434, and thus, the light guide portions 244 and 246 are connected to the light-splitting portion 242. The imaginary surfaces 2432 and 2434 are shown merely as a guide for easy understanding. The light guide 24 is actually casted integrally. Therefore, there are no borders and no cut lines among the light guide portions 244, 246 and the light-splitting portion 242, and these portions are formed as a seamless whole. In the plan views shown by FIGS. 5 and 6, the light guide portions 244 and 246 extend in the positive X-axis direction keeping a distance Δ2 in the Y-axis direction between the imaginary surfaces 2432 and 2434. The positive X-axis ends of the light guide portions 244 and 246 are joined together. In this structure, a space enclosed by the light-splitting portion 242, the light guide portions 244 and 246 is formed as a slit 252 extending in the X-axis direction and having a width (i.e., size in the Y-axis direction) of Δ2.

The light guide portions 244 and 246 are preferably symmetrical with each other about the longitudinal median plane C. Specifically, the light guide portion 244 is located at the positive Y-axis side with respect to the reading area A, and the light guide portion 246 is located at the negative Y-axis side with respect to the reading area A.

Figure 7:
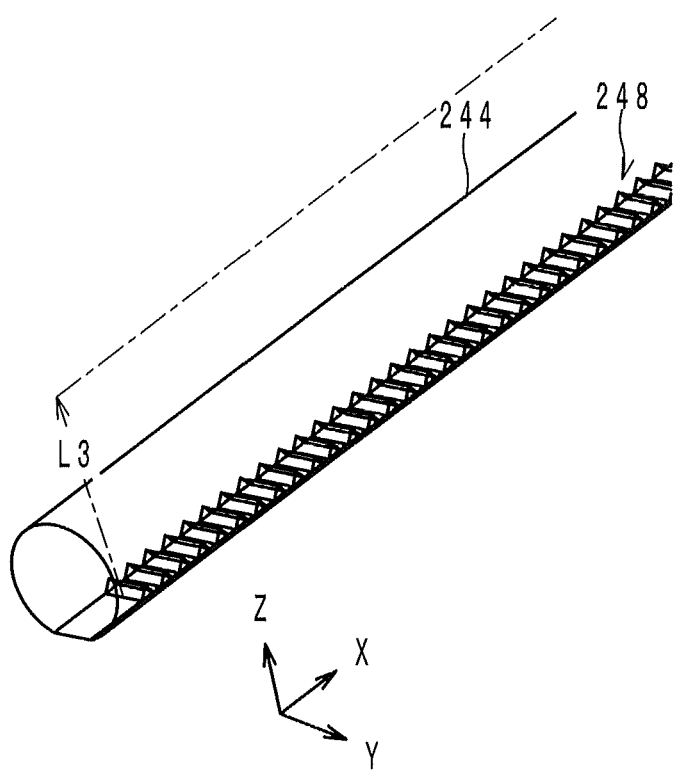
FIG. 7 is a view showing a first constructive example of a first reflective portion shown in FIG. 3.

A first reflective portion 248 is provided in or on the light guide portion 244, at the negative z-axis end. The reflective portion 248 has a length enough to cover the length (i.e., size in the X-axis direction) of the reading area A. For example, as shown by FIG. 7, the reflective portion 248 is composed of a plurality of prisms arranged in the X-axis direction. A second reflective portion 250 is provided in or on the light guide portion 246, at the negative z-axis end so as to be symmetrical with the first reflective portion 248 about the longitudinal median plane C.

Propagation of Light in the Illuminating Device

Figure 8:
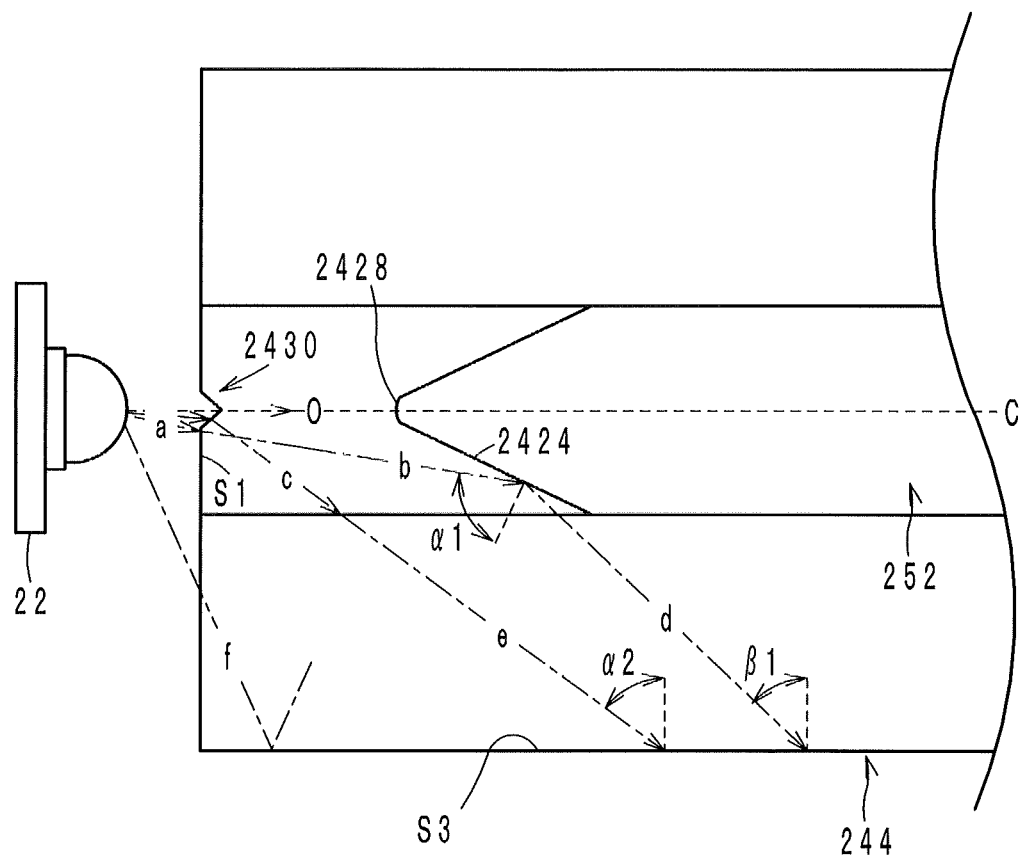
FIG. 8 is a schematic view showing propagation of light in the illuminating device shown by FIG. 1.

The point light source 22 emits light as shown by arrow a in FIG. 8. Most part of the emitted light a passes through the main surface S1 and propagates in the light-splitting portion 242 as transmitted light b (as shown by arrow b). The remaining part of the emitted light a passes through the light-diffusing section 2430 and propagates in the light-splitting portion 242 as transmitted light c (as shown by arrow c).

The transmitted light b enters the inclined surface 2424 at an incident angle of α1. In terms of effective usage of the light a emitted from the point light source 22, it is preferred that the transmitted light b is total-reflected by the inclined surface 2424. The light d reflected by the inclined surface 2424 (light as shown by arrow d) propagates in the light-splitting portion 242 and the light guide 244 and enters a boundary surface S3 between the light guide 244 and the outside (typically air) at an incident angle of β1. It is preferred that the light d is total-reflected by the boundary surface S3. For the purpose of the total reflection at the inclined surface 2424 and the boundary surface S3, the angle θ of the inclined surface 2424 to the longitudinal median plane C (see FIG. 5) meets the condition defined by the expression (1).

If the light-diffusing section 2430 is not provided, the part of the emitted light a near the optical axis O will enter the connection surface 2428. Unlike the inclined surface 2424, the connection surface 2428 is not designed with consideration of total reflection. Therefore, light entering the connection surface 2428 will be reflected diffusely and/or transmitted, and the light will leak from the light guide 24 to the outside. Such light leakage disturbs effective usage of the emitted light a. According to the present embodiment, however, the light-diffusing section 2430 arranged at the angle $θ_y$ to the longitudinal median plane C (see FIG. 6) deflects light entering thereto toward the inclined surface 2424 or the light guide portion 244. The part e of the transmitted light c traveling toward the light guide portion 244 (light shown by arrow e) enters the boundary surface S3 at an incident angle of α2. If the angle $θ_y$ is too small, the light e will leak to the outside through the boundary surface S3. The angle $θ_y$ of the light-diffusing section 2430 to the longitudinal median plane C meets the condition defined by the expression (3) so that the incident angle α2 will not be larger than the critical angle. With the light-diffusing section 2430, the quantity of light traveling to the connection surface 2428 becomes very small, and the light leakage through the connection surface 2428 can be reduced.

Practically, the line of intersection between the inclined surfaces 24302 and 24303 may somewhat shift from the optical axis O in the Y-axis direction due to an error in positioning the point light source 22. It is necessary that the light-diffusing section 2430 has such a size in the Y-axis direction as to split the light entering thereto (the light near the optical axis O) toward the inclined surfaces 2424 and 2426 even with such a positioning error. In order to prevent light leakage attributed to the arc shape of the connection surface 2428, the light-diffusing section 2430 needs to diverge light entering thereto. From this perspective, in this embodiment, on the assumptions that there is a positioning error of 0.5 mm and that the arc-like connection surface 2428 has a radius of 0.5 mm, the light-diffusing section 2430 has a width (size in the Y-axis direction) Δ1 of 1 mm.

Among the light a emitted from the point light source 22, light f emitted at a large angle (as shown by arrow f) is total-reflected by the boundary surface S3 and enters the inclined surface 2424, which causes light leakage through the inclined surface 2424. In order to minimize the light leakage, the distance L is set within the range defined by the expression (2).

The description given thus far is about propagation of light in the light guide 24, in the positive Y-axis side of the longitudinal median plane C. Further, light propagates in the same way in the negative Y-axis side.

As described above, the light-splitting portion 242 has various arrangements for effective usage of the light a emitted from the point light source 22. As a result, the light-splitting portion 242 diverges the emitted light a into first light L1 and second light L2 effectively, and guides the first light L1 and the second light L2 into the first light guide portion 244 and the second light guide portion 246 respectively.

In the light guide portion 244, the first light L1 basically propagates in the X-axis direction while being total-reflected by the boundary surface S3 repeatedly. During the propagation, part of the light L1 entering the reflective portion 248 (see FIG. 4) changes its propagation direction and emerges as a first linear light beam L3 from the light-guide portion 244 through the positive Z-axis end thereof. Part of the light L1 guided to the X-axis end of the light guide 244 without entering the reflective portion 248 enters the light guide portion 246.

Like the first light L1, the second light L2 propagates in the X-axis direction in the light guide portion 246 while being total-reflected repeatedly in the light guide portion 246. During the propagation, part of the light L2 entering the reflective portion 250 (see FIG. 4) changes its propagation direction and emerges as a second linear light beam L4 from the light-guide portion 246 through the positive Z-axis end thereof. Part of the light L2 guided to the X-axis end of the light guide 246 without entering the reflective portion 250 enters the light guide portion 244.

As shown in FIG. 4, the light guide portions 244 and 246 irradiate the reading area A with the linear light beams L3 and L4 from both sides of the reading area A in the plan view shown by FIG. 4. With this arrangement, even if a document D placed on the platen glass 16 has ruck or an uplifted portion, it is possible to prevent generation of shadows. More specifically, the light guide 24 is symmetrical about the longitudinal median plane C and can emit the linear light beams L3 and L4 having substantially the same intensity to the reading area A. Thereby, even if the document D on the platen glass 16 has ruck and/or an uplifted portion, shadows can be minimized. Light reflected by the reading area A passes through the slit 252 and finally enters the image pick-up device 114.

Other Constructive Examples of the First and Second Light Guide Portions

Figure 9:
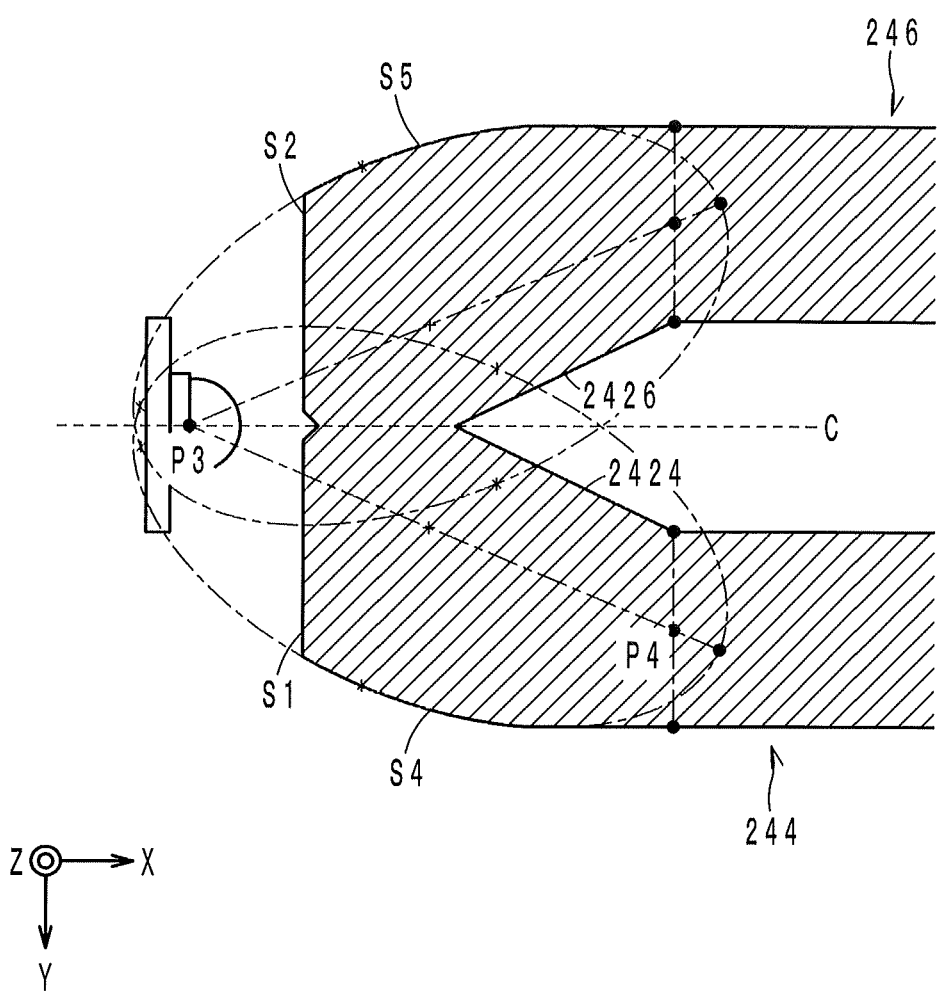
FIG. 9 is a view showing another constructive example of a first light guide and a second light guide of the illuminating device shown in FIG. 1.

As shown in FIG. 3 and some other drawings, in the embodiment above, the negative X-axis end portions of the light guide portions 244 and 246 are rectangular in the plan view shown by FIG. 3. However, as shown by FIG. 9, the first light guide portion 244 may have, in the negative X-axis end portion, a first curved surface S4 connected to the positive Y-axis end of the main surface S1. The curved surface S4 is preferably an ellipsoid having two focal points on the light-emitting point P3 of the point light source 22 and on a fourth point P4. The fourth point P4 is located in the same X-axis position as the positive X-axis end of the inclined surface 2424 and on the Y-axis center point of the light guide portion 244. In this case, the second light guide portion 246 has, in the negative X-axis end portion, a second curved surface S5 symmetrical with the first curved surface S4 about the longitudinal median plane C.

In the example above, the fourth point P4 may be any other point as long as it is located inside the light guide portion 244.

Other Constructive Examples of the Light-Diffusing Section

Figure 10:
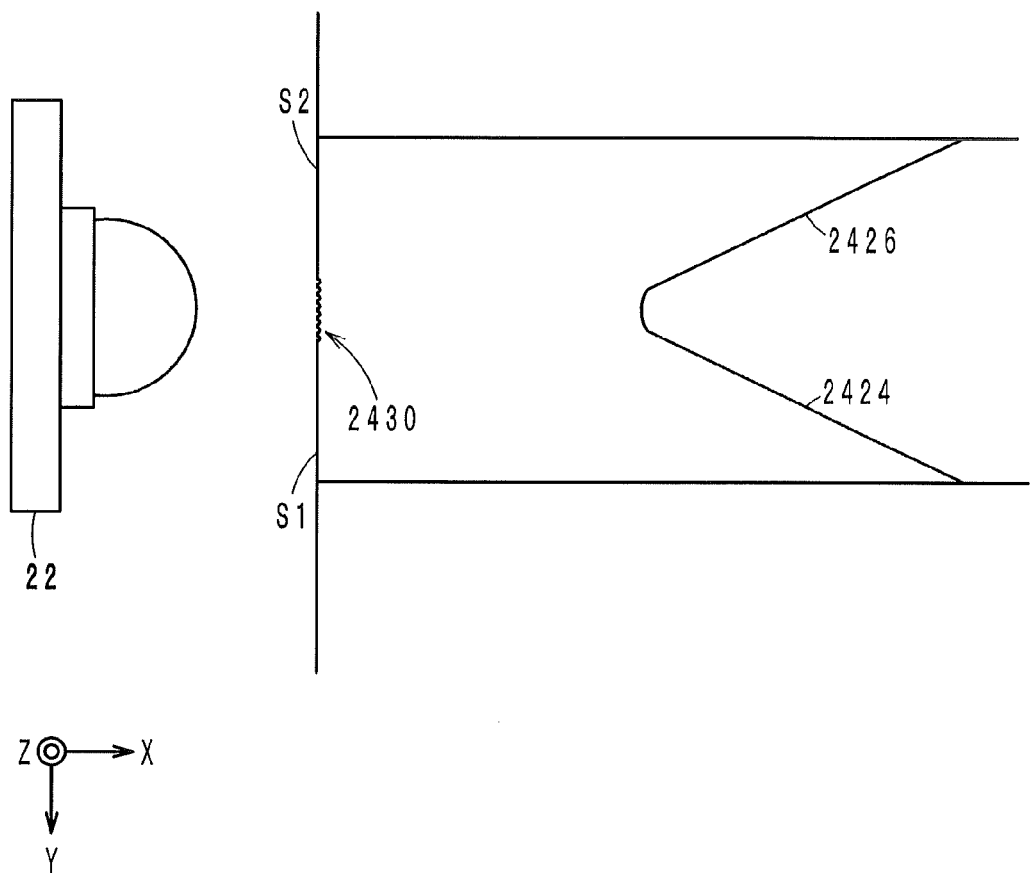
FIG. 10 is a view showing another constructive example of a light-diffusing section shown in FIG. 4.
Figure 11:
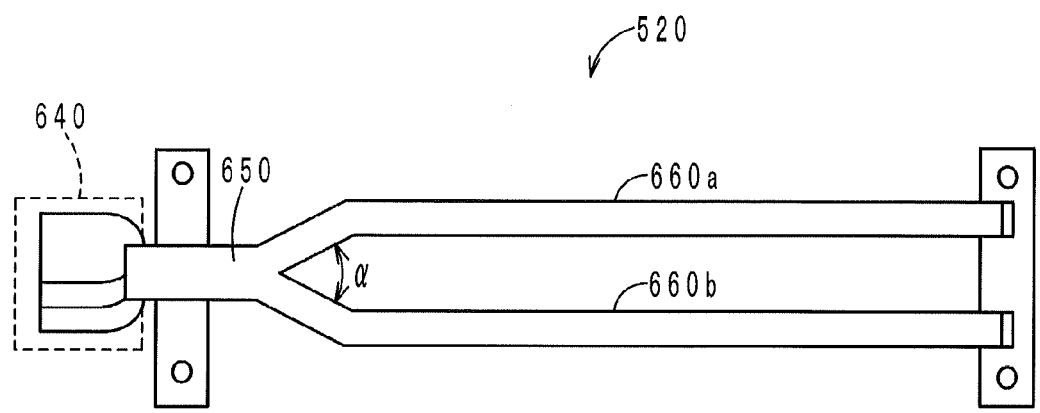
FIG. 11 is a view showing a conventional illuminating device.

In the embodiment above, the light-diffusing section 2430 is a notch. As shown by FIG. 10, however, the light-diffusing section 2430 may be a portion with minuscule convexities provided between the main surfaces S1 and S2. The minuscule convexities may project toward the point light source 22 or toward the inclined surfaces 2424 and 2426.

Other Constructive Examples of the First and Second Reflective Portions

In the embodiment above, each of the reflective portions 248 and 250 comprises a plurality of prisms. The reflective portions 248 and 250 are not limited to this structure. The reflective portions 248 and 250 may be white dot patterns formed inside the light guide portions 244 and 246, on the Z-axis end surfaces, respectively, by painting or printing. Alternatively, white dot patterns are formed on the surfaces of the light guide portions 244 and 246, on the Z-axis end surfaces, respectively.

Advantageous Effects of the Light Guide

As described above, according to the embodiment, light emitted from the point light source 22 is deflected by the light-diffusing section 2430 to travel to the first light guide portion 244 and to the second light guide portion 246. With the light-diffusing section 2430, the light is prevented from entering the connection surface 2428. As a result, light leakage from the light guide 24 to the outside can be significantly reduced. Accordingly, the light guide 24 can generate a first linear light beam L3 and a second linear light beam L4 by making effective use of the light emitted from the single point light source 22.

It is preferred that the angle θ is designed to meet the condition defined by the expression (1). In this case, light transmitted by the main surfaces S1 and S2 is total-reflected by the inclined surface 2424 or 2426, and the light reflected by the inclined surface 2424 or 2426 is total-reflected by the boundary surface 244 or 246. Thus, light leakage through the inclined surfaces 2424 and 2426 and the boundary surfaces 244 and 246 can be minimized. As a result, the light guide 24 can make more effective use of the light emitted from the single point light source 22 to generate the first linear light beam L3 and the second linear light beam L4.

The slit 252 provided between the light guide portions 244 and 246 prevents the light reflected by the reading area A from entering the light guide again. Thus, a loss due to reflection and absorption caused by reentering of light into the light guide can be prevented.

The light-diffusing section 2430 is a notch made toward the light-splitting portion 242. This simple structure permits the light-diffusing section 2430 to diverge the intense light near the optical axis O of the point light source 22 so as to deflect the light toward the inclined surfaces 2424 and 2426 and the light guide portions 244 and 246 while minimizing the quantity of light entering the connection surface 2428. As a result, the light guide 24 can make more effective use of the light emitted from the single point light source 22 to generate the first linear light beam L3 and the second linear light beam L4.

It is preferred that the angle $\theta_y$ of each of the inclined surfaces 24302 and 24304 to the central vertical surface C is designed to meet the condition defined by the expression (3). In this case, light transmitted by the light-diffusing section 2430 can be prevented from leaking to the outside through the boundary surfaces of the light guide portions 244 and 246. As a result, the light guide 24 can make more effective use of the light emitted from the single point light source 22 to generate the first linear light beam L3 and the second linear light beam L4.

Also, since the light guide 24 has a symmetrical shape of about the longitudinal median plane C, the light guide 24 can generate linear light beams L3 and L4 travelling in a symmetrical direction with each other about the longitudinal median plane C and having the substantially same intensity. As a result, the image pick-up device 114 can generate electric signals that are hardly affected by a shadow due to a fold line or the like of the document D.

Further, by designing the distance L within the range defined by the expression (2), when part of light emitted from the point light source 22 at a large radiation angle is total-reflected by the boundary surface S3 and enters the inclined surface 2424, the light can be prevented from leaking to the outside through the inclined surface 2424. As a result, the light guide 24 can make more effective use of the light emitted from the single point light source 22 to generate the first linear light beam L3 and the second linear light beam L4.

Also, in a case in which the boundary surfaces of the light guide portions 244 and 246 are connected to the entrance portion 2422 by curved surfaces (especially ellipsoids), part of light emitted from the point light source 22 at a large radiation angle can be directed to the light guide portions 244 and 246 effectively. As a result, the light guide 24 can make more effective use of the light emitted from the single point light source 22 to generate the first linear light beam L3 and the second linear light beam L4.

When the above-described light guide 24 is employed in the illuminating device 116, the illuminating device 116 has the advantages above. In the illuminating device 116, additionally, since the use of only a single point light source 22 and a single light guide 24 permits irradiation of the linear light beams L3 and L4 to the reading area A from two directions, the structure of the illuminating device 116 can be simplified, and the number of necessary components can be reduced.

Also, when the illuminating device 116 is employed in the image reading apparatus 1, the image reading apparatus 1 has the advantages above. In the image reading apparatus 1, additionally, since a plurality of linear light beams L3 and L4 are generated from light emitted from the single point light source 22, there occurs no chromaticity difference between the linear light beams L3 and L4. As a result, the image reading apparatus 1 can generate electric signals that are high-quality representation of the image of the document D.

Although the present invention has been described in connection with the preferred embodiments above, it is to be noted that various changes and modifications are possible for a person skilled in the art. Such changes and modifications are to be understood as being within the scope of the present invention.

What is claimed is:

1. A light guide comprising:
   an entrance portion which light emitted from a point light source enters;
   a light-splitting portion configured to split the light passing through the entrance portion into first light and second light;
   a first light guide portion and a second light guide portion configured to guide the first light and the second light, respectively, in a specified direction while total-reflecting the first light and the second light, respectively; and
   a first reflective portion and a second reflective portion provided in the first light guide portion and in the second light guide portion, respectively, the first reflective portion and the second reflective portion configured to reflect the first light propagating in the first light guide portion and the second light propagating in the second light guide portion, respectively;
   wherein the first light guide portion and the second light guide portion are configured to emit part of the first and second light to outside as a first linear light beam and a second linear light beam, respectively;
   wherein the light-splitting portion projects toward the entrance portion, and includes a first inclined surface, a second inclined surface and a connecting section, the first inclined surface and the second inclined surface extending toward a first point on an optical axis of the point light source and being substantially symmetrical with each other when viewed from a direction perpendicular to the optical axis, the connecting section connecting the first inclined surface and the second inclined surface near the first point;
   wherein the entrance portion includes a light-diffusing section opposed to the connecting section in a direction of the optical axis, the light-diffusing section configured to diffuse the light emitted from the point light source toward the first light guide portion and the second light guide portion;
   wherein each of the first light guide portion and the second light guide portion comprises a boundary surface with outside; and
   wherein each of the first inclined surface and the second inclined surface is at an angle of $\theta$ to the optical axis, the angle $\theta$ being such a value that the first inclined surface and the second inclined surface total-reflect the light passing through the entrance portion and entering thereto and such that the boundary surfaces total-reflect the first light and the second light generated by the total-reflection at the first and second inclined surfaces and entering thereto, the angle $\theta$ being a value fulfilling the following condition, $$\theta \leq \frac{\pi}{4} - \frac{1}{2} \cdot \arcsin\frac{1}{n}$$

in which n denotes a refractive index of the light guide, and $\theta=0$ means that the first inclined surface and the second inclined surface are perpendicular to a surface on which the entrance portion is provided.

2. The light guide according to claim 1,
   wherein the first linear light beam and the second linear light beam are emitted to an object for irradiation; and
   wherein a slit extending in the specified direction is provided between the first light guide portion and the second light guide portion, the slit configured to transmit light reflected by the object for irradiation.

3. The light guide according to claim 1,
   wherein the light-diffusing section is a groove projecting toward the light-splitting portion and comprising a third inclined surface and a fourth inclined surface substantially symmetrical with each other about the optical axis when viewed from the direction perpendicular to the optical axis; and
   wherein the third inclined surface and the fourth inclined surface are connected to each other at a second point on the optical axis, the second point located closer to the entrance portion than the first point.

4. The light guide according to claim 3,
   wherein each of the third inclined surface and the fourth inclined surface is at an angle of $\theta_v$ to a surface perpendicular to the optical axis, the angle $\theta_v$ being a value fulfilling the following condition, $$\theta_v \geq \arcsin\frac{1}{n}$$

in which n denotes a refractive index of the light guide, and $\theta_v=0$ means that the third inclined surface and the fourth inclined surface are perpendicular to a surface on which the entrance portion is provided.

5. The light guide according to claim 1, having a symmetrical shape about a central plane in parallel to the direction of the optical axis and the direction perpendicular to the optical axis.

6. The light guide according to claim 1,
   wherein a distance L between the entrance portion and the light-splitting portion fulfills the following condition, $$L \leq \frac{d}{\tan\left\{\arcsin\left(\frac{\sin\gamma}{n}\right)\right\}} - \frac{D-d}{\tan\theta}$$

in which D denotes a half of a size of the light guide in a horizontal direction perpendicular to the optical axis, d denotes a size of each of the first light guide portion and the second light guide portion in the horizontal direction, and $\gamma$ denotes a maximum radiation angle of the point light source.

7. The light guide according to claim 1,
   wherein the first light guide portion and the second light guide portion comprise a first curved surface and a second curved surface, respectively, connected to the entrance portion; and
   wherein the first curved surface and the second curved surface are configured not to reflect light entering thereto to the first inclined surface and the second inclined surface.

8. The light guide according to claim 7,
wherein the first curved surface and the second curved surface are a first ellipsoid having two focal points on a light-emitting point of the point light source and on a point inside the first light guide portion and a second ellipsoid having two focal points on the light-emitting point of the point light source and on a point inside the second light guide portion, respectively, when viewed from the direction perpendicular to the optical axis.

9. The light guide according to claim 1,
wherein the light-diffusing section comprises a plurality of convexities provided on the entrance portion.

10. An illuminating device comprising the light guide according to claim 1.

11. An image reading apparatus comprising the illuminating device according to claim 10.

12. A light guide comprising:
an entrance portion which light emitted from a point light source enters;
a light-splitting portion configured to split the light passing through the entrance portion into first light and second light;
a first light guide portion and a second light guide portion configured to guide the first light and the second light, respectively, in a specified direction while total-reflecting the first light and the second light, respectively; and
a first reflective portion and a second reflective portion provided in the first light guide portion and in the second light guide portion, respectively, the first reflective portion and the second reflective portion configured to reflect the first light propagating in the first light guide portion and the second light propagating in the second light guide portion, respectively;
wherein the first light guide portion and the second light guide portion are configured to emit part of the first and second light to outside as a first linear light beam and a second linear light beam, respectively;
wherein the light-splitting portion projects toward the entrance portion, and includes a first inclined surface, a second inclined surface and a connecting section, the first inclined surface and the second inclined surface extending toward a first point on an optical axis of the point light source and being substantially symmetrical with each other when viewed from a direction perpendicular to the optical axis, the connecting section connecting the first inclined surface and the second inclined surface near the first point;
wherein the entrance portion includes a light-diffusing section opposed to the connecting section in a direction of the optical axis, the light-diffusing section configured to diffuse the light emitted from the point light source toward the first light guide portion and the second light guide portion;
wherein the light-diffusing section is a groove projecting toward the light-splitting portion and comprising a third inclined surface and a fourth inclined surface substantially symmetrical with each other about the optical axis when viewed from the direction perpendicular to the optical axis;
wherein the third inclined surface and the fourth inclined surface are connected to each other at a second point on the optical axis, the second point located closer to the entrance portion than the first point; and
wherein each of the third inclined surface and the fourth inclined surface is at an angle of $\theta_v$ to a surface perpendicular to the optical axis, the angle $\theta_v$ being a value fulfilling the following condition, $$\theta_v \geq \arcsin \frac{1}{n}$$

in which n denotes a refractive index of the light guide, and $\theta_v=0$ means that the third inclined surface and the fourth inclined surface are perpendicular to a surface on which the entrance portion is provided.

13. A light guide comprising:
an entrance portion which light emitted from a point light source enters;
a light-splitting portion configured to split the light passing through the entrance portion into first light and second light;
a first light guide portion and a second light guide portion configured to guide the first light and the second light, respectively, in a specified direction while total-reflecting the first light and the second light, respectively; and
a first reflective portion and a second reflective portion provided in the first light guide portion and in the second light guide portion, respectively, the first reflective portion and the second reflective portion configured to reflect the first light propagating in the first light guide portion and the second light propagating in the second light guide portion, respectively;
wherein the first light guide portion and the second light guide portion are configured to emit part of the first and second light to outside as a first linear light beam and a second linear light beam, respectively;
wherein the light-splitting portion projects toward the entrance portion, and includes a first inclined surface, a second inclined surface and a connecting section, the first inclined surface and the second inclined surface extending toward a first point on an optical axis of the point light source and being substantially symmetrical with each other when viewed from a direction perpendicular to the optical axis, the connecting section connecting the first inclined surface and the second inclined surface near the first point;
wherein the entrance portion includes a light-diffusing section opposed to the connecting section in a direction of the optical axis, the light-diffusing section configured to diffuse the light emitted from the point light source toward the first light guide portion and the second light guide portion;
wherein the first light guide portion and the second light guide portion comprise a first curved surface and a second curved surface, respectively, connected to the entrance portion;
wherein the first curved surface and the second curved surface are configured not to reflect light entering thereto to the first inclined surface and the second inclined surface; and
wherein the first curved surface and the second curved surface are a first ellipsoid having two focal points on a light-emitting point of the point light source and on a point inside the first light guide portion and a second ellipsoid having two focal points on the light-emitting point of the point light source and on a point inside the second light guide portion, respectively, when viewed from the direction perpendicular to the optical axis.

* * * * *